US010552690B2

(12) United States Patent
Schubert et al.

(10) Patent No.: US 10,552,690 B2
(45) Date of Patent: Feb. 4, 2020

(54) INTUITIVE OCCLUDED OBJECT INDICATOR

(71) Applicant: X Development LLC, Mountain View, CA (US)

(72) Inventors: Martin Friedrich Schubert, Mountain View, CA (US); Philip Edwin Watson, Santa Cruz, CA (US)

(73) Assignee: X Development LLC, Mountain View, CA (US)

( * ) Notice: Subject to any disclaimer, the term of this patent is extended or adjusted under 35 U.S.C. 154(b) by 230 days.

(21) Appl. No.: 15/343,483

(22) Filed: Nov. 4, 2016

(65) Prior Publication Data

US 2018/0129888 A1    May 10, 2018

(51) Int. Cl.
*G06K 9/00* (2006.01)
*G08G 1/16* (2006.01)
(Continued)

(52) U.S. Cl.
CPC ............ *G06K 9/00805* (2013.01); *B60R 1/00* (2013.01); *G06K 9/00335* (2013.01);
(Continued)

(58) Field of Classification Search
CPC ........... G06K 9/00624; G06K 9/00664; G06K 9/00671; G06K 9/00771; G06K 9/00778; G06K 9/00785; G06K 9/00791; G06K 9/00798; G06K 9/00805; G06K 9/00335; G06K 9/00348; G06K 9/00369; G06K 9/52; G06T 7/20; G06T 7/50; G06T 7/70; G06T 11/20; G06T 11/60; G06T 11/00; G08G 1/165; G08G 1/166; G08G 1/167;
(Continued)

(56) References Cited

U.S. PATENT DOCUMENTS 5,357,438 A    10/1994  Davidian
5,594,414 A     1/1997  Namngani
(Continued)

FOREIGN PATENT DOCUMENTS

CN    1495096      5/2004
CN    101625215    1/2010
(Continued)

OTHER PUBLICATIONS

'www.aparchive.com' [online] "[HZ] Japan Car" Nov. 12, 2012, [retrieved on Apr. 5, 2017] Retrieved from Internet: URL<http://www.aparchive.com/metadata/youtube/c49a297ce1422b3f9f203e4ffed24420> 4 pages.
(Continued)

*Primary Examiner* — Eric Rush
(74) *Attorney, Agent, or Firm* — Fish & Richardson P.C.

(57) ABSTRACT

Methods, systems, and apparatus for providing indications of occluded objects. In some aspects a method includes the actions of determining a position of an observer whose view of an object is obstructed by a barrier; determining a position of the object relative to the observer; generating an indication of the position of the object based at least in part on the determined position of the observer; and displaying the indication of the position of the object on a display located between the observer and the barrier.

18 Claims, 8 Drawing Sheets

(51) Int. Cl.
*B60R 1/00* (2006.01)
*G06K 9/52* (2006.01)
*G06T 11/20* (2006.01)
*G06T 11/60* (2006.01)

(52) U.S. Cl.
CPC ..... *G06K 9/00785* (2013.01); *G06K 9/00791* (2013.01); *G06K 9/00798* (2013.01); *G06K 9/52* (2013.01); *G06T 11/20* (2013.01); *G06T 11/60* (2013.01); *G08G 1/165* (2013.01); *G08G 1/166* (2013.01); *B60R 2300/105* (2013.01); *B60R 2300/202* (2013.01); *B60R 2300/30* (2013.01); *B60R 2300/802* (2013.01)

(58) Field of Classification Search
CPC ........... B60R 1/00; B60R 1/001; B60R 1/002; B60R 1/007; B60R 2021/01013; B60R 21/013; B60R 21/0134; B60R 2300/20; B60R 2300/202; B60R 2300/207; B60R 2300/30; B60R 2300/301; B60R 2300/302; B60R 2300/303; B60R 2300/304; B60R 2300/60; B60R 2300/80; B60R 2300/802; B60R 2300/8033; B60R 2300/8093; B60R 2300/105; B60R 2300/308
USPC ....... 382/100, 103, 104, 107, 291, 302, 312, 382/325; 345/7, 9, 418, 419, 421, 619, 345/629, 632–634; 348/61, 143, 148; 340/425.5, 435, 436, 944; 359/613, 618, 359/619, 629, 630; 701/301
See application file for complete search history.

(56) References Cited

U.S. PATENT DOCUMENTS

| | | | |
|---|---|---|---|
| 5,712,732 A | 1/1998 | Street | |
| 6,408,247 B1 | 6/2002 | Ichikawa et al. | |
| 7,132,635 B2 | 11/2006 | Dowling | |
| 7,206,131 B2 | 4/2007 | Alden | |
| 7,880,739 B2 | 2/2011 | Long et al. | |
| 7,978,407 B1* | 7/2011 | Connor | H04N 13/32 359/463 |
| 9,390,558 B2 | 7/2016 | O'Brien | |
| 9,715,827 B2* | 7/2017 | Ng | G06K 9/00785 |
| 9,760,782 B2* | 9/2017 | Augst | G06K 9/00798 |
| 2002/0090131 A1* | 7/2002 | Alden | G02B 26/06 382/154 |
| 2002/0117605 A1* | 8/2002 | Alden | F41H 3/00 250/208.1 |
| 2003/0112521 A1 | 6/2003 | Gardiner et al. | |
| 2004/0252187 A1* | 12/2004 | Alden | H04N 5/66 348/51 |
| 2008/0012938 A1* | 1/2008 | Kubota | B60R 1/00 348/118 |
| 2008/0310675 A1* | 12/2008 | O'Brien | G06T 15/00 382/100 |
| 2009/0140881 A1* | 6/2009 | Sakai | B60R 1/00 340/901 |
| 2010/0002079 A1* | 1/2010 | Krijn | G02B 27/0093 348/148 |
| 2010/0253601 A1* | 10/2010 | Seder | G01S 13/723 345/7 |
| 2010/0315215 A1* | 12/2010 | Yuda | H04N 5/2259 340/435 |
| 2012/0287266 A1* | 11/2012 | Varekamp | G06T 7/004 348/135 |
| 2013/0181823 A1* | 7/2013 | Stahlin | B60K 35/00 340/436 |
| 2014/0019005 A1* | 1/2014 | Lee | G08G 1/166 701/36 |
| 2014/0028549 A1 | 1/2014 | Yuan | |
| 2014/0043433 A1* | 2/2014 | Scavezze | G06T 19/006 348/42 |
| 2014/0168277 A1 | 6/2014 | Ashley | |
| 2014/0288817 A1 | 9/2014 | Dowdall et al. | |
| 2014/0313365 A1 | 10/2014 | Lehtinienni | |
| 2015/0002642 A1* | 1/2015 | Dressler | G06T 3/00 348/51 |
| 2015/0154445 A1 | 6/2015 | Biswas | |
| 2015/0235398 A1* | 8/2015 | Kim | G06T 7/0044 345/633 |
| 2015/0258991 A1 | 9/2015 | Fletcher et al. | |
| 2015/0310273 A1* | 10/2015 | Shreve | G06K 9/00624 382/103 |
| 2016/0297362 A1 | 10/2016 | Tijerina et al. | |

FOREIGN PATENT DOCUMENTS

| | | |
|---|---|---|
| CN | 105511216 | 4/2016 |
| DE | 202011104126 | 12/2011 |
| EP | 2168815 | 3/2010 |
| EP | 2511121 | 10/2012 |

OTHER PUBLICATIONS

'www.livescience.com' [online] "Ultrathin 'Invisibility Cloak' Can Match Any Background," Jesse Emspak, Sep. 17, 2015 [retrieved on Feb. 6, 2017] Retrieved from Internet: URLhttp://www.livescience.com/52216-ultrathin-invisibility-cloak.html> 6 pages.

'www.news.samsung.com' [online] "The Safety Truck Could Revolutionize Road Safety," Jun. 18, 2015 [retrieved on Feb. 6, 2017] Retrieved from Internet: URL<https://news.samsung.com/global/the-safety-truck-could-revolutionize-road-safety> 3 pages.

'www.physics.org' [online] "How do 'invisibility cloaks' work?," [Retrieved on Feb. 6, 2017] Retrieved from Internet: URL<http://www.physics.org/article-questions.asp?id=69> 2 pages.

Bukhari et al. "An intelligent real-time multi-vessel collision rise assessment system from VTS view point based on fuzzy inference system," Expert Systems with Applications 40(4), Jan. 2012, 12 pages.

Conesa et al. "Display Blocks: Cubic Displays for Multi-Perspective Visualizations," Master's Thesis, Massachusetts Institute of Technology, Sep. 2012, 111 pages.

Gomes et al. "The See-Through System: From Implementation to Test-Drive," IEEE, Vehicular Networking Conference, Nov. 14, 2012, 9 pages.

Ni et al. "An ultrathin invisibility skin cloak for visible light," Science 349.6254, Sep. 18, 2015, 6 pages.

Pendry. "Hiding Under the Carpet: a New Strategy for Cloaking," arXiv preprint arXiv 0806.1396v1, Jun. 26, 2008, 11 pages.

Weidl et al. "Collision Rise Prediction and Warning at Road Intersections Using an Object Orientated Bayesian Network," ACM, Proceedings of the 5$^{th}$ International Conference on Automotive User Interfaces and Interactive Vehicular Applications, Oct. 2013, 9 pages.

International Search Report issued in International Application No. PCT/US2017/059840, dated Feb. 14, 2018, 10 pages.

'bee-inc.com' [online]. "How to Look at Invisible Buildings | South Korea's Tower Infinity," Sep. 2013, [retrieved on Dec. 20, 2016] Retrieved from Internet: URL<https://www.bee-inc.com/tag/gds-architects/> 2 pages.

'content.time.com' [online]. "Invisible Technology," 2003, [retrieved on Dec. 21, 2016]. Retrieved from the Internet: URL<http://content.time.com/time/specials/packages/article/0,28804,1935038_1935085_1935990,00.html> 1 page.

digitaltrends.com [online] "New Invisibility Cloak Device Can Hide Almost Anything," Sep. 2014, [retrieved on Dec. 21, 2016] Retrieved from Internet: URL<http://www.digitaltrends.com/cool-tech/new-invisibility-cloak-device-can-hide-almost-anything/> 5 pages.

'fovi3d.com' [online] "FOVI3D," [retrieved on Dec. 21, 2016] Retrieved from the Internet: URL<http://www.fovi3d.com/light-field-display/> 3 pages.

(56) References Cited

OTHER PUBLICATIONS

'iq.intel.com' [online]. "The Science Behind Real-Life Invisibility Cloaks," Feb. 2015, [retrieved on Dec. 21, 2016]. Retrieved from the Internet: URL<http://iq.intel.com/science-behind-real-life-invisibility-cloaks/> 9 pages.
'livescience.com' [online]. "Ultrathin 'Invisibility Cloak' Can Match Any Background," Sep. 2015, [retrieved on Dec. 21, 2016] Retrieved from the Internet: URL<http://www.livescience.com/52216-ultrathin-invisibility-cloak.html> 3 pages.
'mashable.com' [online]. "Samsung attaches screento semi-truck to show the road ahead," [retrieved on Dec. 21, 2016] Retrieved from Internet: URL< http://mashable.com/2015/06/22/samsung-truck-camera/#4X1C2wKKZkqM> 4 pages.
'newatlas.com' [online]. "Samsung creates "transparent" truck," Jun. 2015, [retrieved on Dec. 21, 2016] Retrieved from Internet: URL< http://newatlas.com/samsung-safety-truck-cameras-screens/38122/> 2 pages.
'pas.rochester.edu' [online]. "Practical Invisibility Cloaking," 2016, [retrieved on Dec. 21, 2013] Retreieved from the Internet: URL<http://www.pas.rochester.edu/~jhgroup/alumni_theses/choi_thesis.pdf> 139 pages.
'quora.com' [online]. "How much of the technology in Mission: Impossible—Ghost Protocol feasible today?," May 2014, [retrieved on Dec. 21, 2016] Retrieved from the Internet: URL<https://www.quora.com/How-much-of-the-technology-in-Mission-Impossible-Ghost-Protocol-feasible-today> 3 pages.
'rochester.edu' [online]. "'cloaking' device uses ordinary lenses to hide objects across range of angles," Sep. 2014 [retrieved on Dec. 21, 2016] Retrieved from the Internet: URL<http://www.rochester.edu/newscenter/watch-rochester-cloak-uses-ordinary-lenses-to-hide-objects-across-continuous-range-of-angles-70592/> 6 pages.
'tvtropes.org' [online]. "Mission: Impossible—Ghost Protocol," [retrieved on Nov. 10, 2016] Retrieved from Internet: URL<http://tvtropes.org/pmwiki/pmwiki.php/Film/MissionImpossibleGhostProtocol> 2 pages.
'wikipedia.com' [online]. "Active camouflage," Nov. 2016, [retrieved on Dec. 21, 2016] Retrieved from the Internet: URL<https://en.wikipedia.org/w/index.php?title=Active_camouflage&action=history> 4 pages.
'wikipedia.org' [online]. "light field," Oct. 2016, [retrieved on Dec. 21, 2016] Retrieved from the Internet: URL<https://en.wikipedia.org/w/index.php?title=Light_field&action=history> 7 pages.
'wired.com' [online]. "The Super Power Issuebeing Invisible," Aug. 2003, [Retrieved on Dec. 21, 2016] Retrieved from the Internet: URL<https://www.wired.com/2003/08/pwr-invisible/> 5 pages.
Lanman et al. "Near-Eye Field Displays," ACM Transactions on Graphics (TOG) 32.6, Nov. 2013, 10 pages.
Li et al. "Hiding Under the Carpet: a New Strategy for Cloaking," Physical Review Letters 101, No. 20, 2008, 11 pages.
Office Action issued in U.S. Appl. No. 15/386,691, dated Sep. 28, 2018, 17 pages.
PCT International Preliminary Report on Patentability in International Appln. No. PCT/US2017/059840, dated May 16, 2019, 7 pages.

* cited by examiner

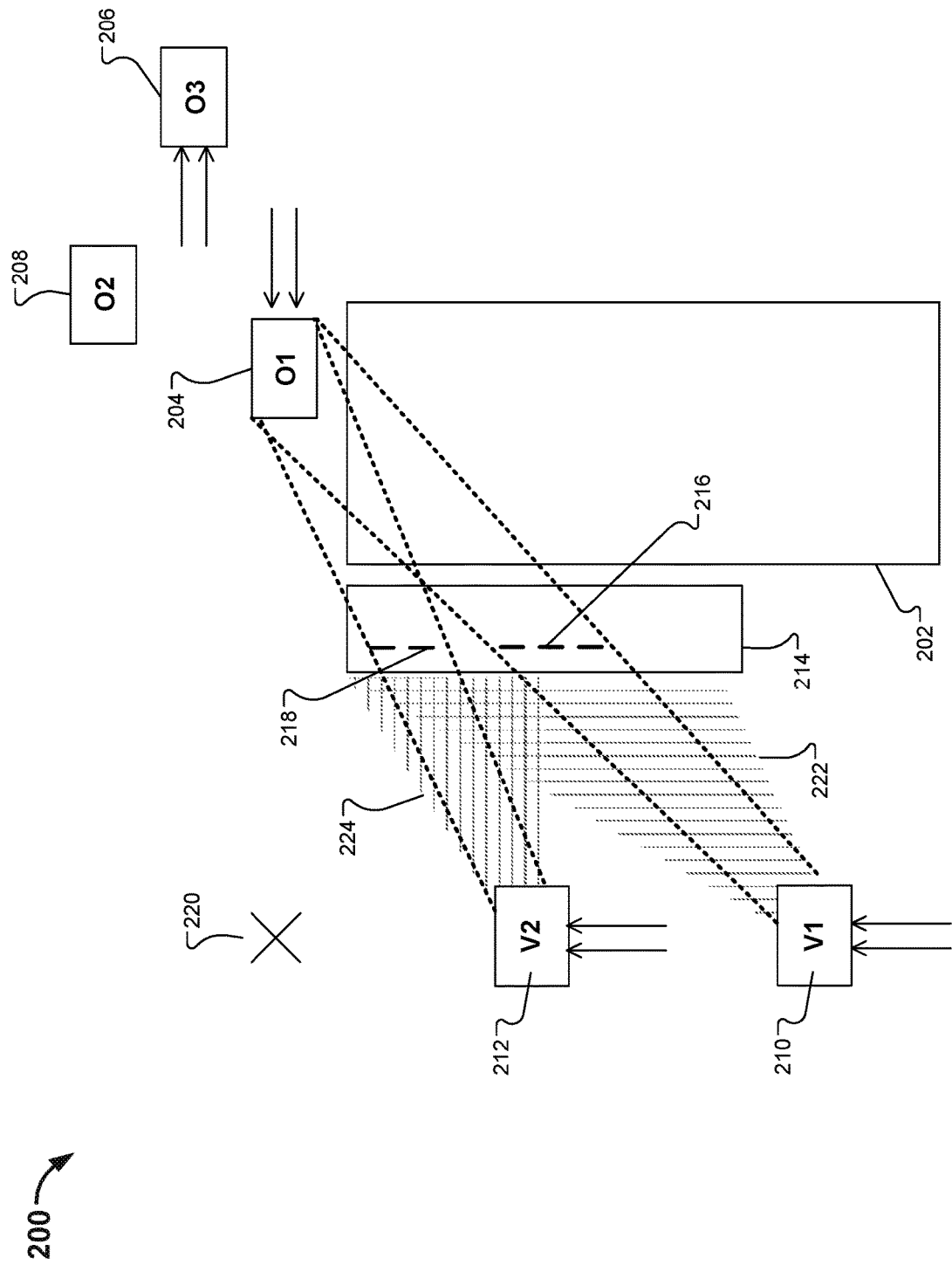

INTUITIVE OCCLUDED OBJECT INDICATOR

TECHNICAL FIELD

This specification describes techniques for providing indicators of occluded objects. This specification relates to the fields of display devices, safety systems for transportation, machine learning, and others discussed below.

BACKGROUND

A driver's lack of awareness of people or vehicles approaching a merger or intersection can result in collisions. In many instances, a driver's awareness is limited due to an inability to see an object until it becomes a hazard. For example, a driver's view of a vehicle approaching an intersection may be blocked by an object, such as a building. The approaching vehicle may appear in the driver's view only at or very near the intersection, leaving little time for the driver to recognize the danger and react. In general, the lack of visibility of occluded objects is a factor that contributes to many collisions.

SUMMARY

This specification describes systems and methods for detecting objects hidden behind an occlusion and providing a visual representation of the detected objects. For example, a display can be draped over a wall and an image can be shown on the display to represent objects behind the wall. The image is dynamically updated to emulate a directionality and relative size at which the object would appear to the viewer if there were no occlusion.

The display can include an array of light emitting diodes (LEDs) on a flexible backing that enable digitally controlled directionality of an image displayed on the display. For example, each pixel of an image displayed on the indicator surface may be represented by multiple LEDs that each output light at a different angle. In this manner, a single display may provide different images representing a same hidden object to multiple viewers of the display, where each image is personalized to a respective viewer.

The systems and methods described in this specification may be applied to any scenario where a lack of awareness of objects or people can result in collisions, e.g., in cases where a driver's awareness of people or vehicles approaching an intersection is hindered by a wall. By hanging a display as described in this specification from the wall, drivers may be provided with a visual representation of objects hidden by the wall.

Different drivers may be shown different visual representations that are personalized according to their position. For example, at a given instance in time, a first driver that is first in a queue of traffic approaching an intersection may be provided with a visual representation of an occluded vehicle that is travelling along a road towards the intersection, e.g., if the occluded vehicle is a potential cause of collision. A second driver that is behind the first driver in the queue of traffic approaching the intersection may be concurrently provided with a different visual representation. For example, the second driver may be provided with a visual representation of the vehicle and with a visual representation of an occluded person running towards the intersection, e.g., if the vehicle and the person are potential causes of collision for the second driver.

In settings where a collision risk between a driver and an occluded object is high, a visual representation of the occluded object may include personalized safety information or instructions. Continuing the example above, the first driver may be shown a high resolution visual representation of the occluded vehicle, e.g., indicating that the vehicle poses a collision risk. The second driver may be shown a high resolution visual representation of the occluded vehicle and person that includes a warning sign instructing the second driver to yield at the intersection, e.g., indicating that the person and/or vehicle have the right of way at the intersection and that they pose high collision risks.

Innovative aspects of the subject matter described in this specification may be embodied in methods that include the actions of determining a position of an observer whose view of an object is obstructed by a barrier; determining a position of the object relative to the observer; generating an indication of the position of the object based at least in part on the determined position of the observer; and displaying the indication of the position of the object on a display located between the observer and the barrier.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations the method further comprises determining respective positions of multiple observers whose respective views of the object is obstructed by the barrier; and concurrently displaying, on the display, different views of the object to each of the observers based on the determined respective positions of the multiple observers.

In some implementations each different view of the object corresponds to a intersection of (i) a three-dimensional space between the respective observer's field of vision and the object, and (ii) the display.

In some implementations each different view of the object comprises a representation of the object that has a size and position in a respective observer's field of view that corresponds to a size and position that the object would have in the respective observer's field of view if the barrier were not present.

In some implementations the method further comprises dynamically changing the indication of the position of the object as the position of the observer and object changes.

In some implementations the method further comprises detecting a set of objects behind the barrier at multiple times; and filtering, from the set of detected objects, objects that have not moved more than a predetermined minimum amount over a period of time.

In some implementations the method further comprises determining a position of an observer whose view of multiple objects is obstructed by a barrier; determining, for each of the multiple objects, a position of the object relative to the observer; generating, for one or more of the multiple objects, an indication of the position of the object based at least in part on the determined position of the observer; and displaying the generated indications on a display located between the observer and the barrier.

In some implementations generating, for one or more of the multiple objects, an indication of the position of the object based at least in part on the determined position of the observer comprises: generating, for each of the multiple objects, a relevance score indicative of a predicted relevance of the object to an observer whose view of the object is obstructed by the barrier; and selecting a proper subset of the one or more objects based on the generated relevance scores.

In some implementations displaying the generated indications on a display located between the observer and the barrier comprises displaying, on the display, an indication of the detected objects in the subset.

In some implementations generating the relevance scores comprises generating, for each of the multiple objects, a relevance score based on one or more of (i) a size of the object, (ii) a shape of the object, (iii) movement of the object, (iv) a trajectory of the object, (v) proximity of the object to the barrier, (vi) an image recognition score for the object, (vii) a position of the observer, (viii) a trajectory of the observer, (ix) a measure of the observer's ability to brake or change trajectory, (x) historical data indicating objects in proximity to the barrier, (xi) historical data indicating similar types of barriers, or (xii) capabilities of the objects.

In some implementations the method further comprises selecting a representation for a particular object, from among multiple different representations for the object, based on the relevance score for the particular detected object.

In some implementations generating the relevance scores comprises applying machine learning techniques.

In some implementations the method further comprises augmenting the generated indication of the position of the object based at least in part on the determined position of the observer with context or emphasis information.

In some implementations the method further comprises providing an indication that the display is active and operating.

In some implementations the barrier and display are stationary.

In some implementations the barrier and display are mobile.

The subject matter described in this specification can be implemented in particular embodiments so as to realize one or more of the following advantages.

As noted above, a lack of awareness of other people or vehicles approaching a merger, crossing or intersection can result in collisions. Approaches such as fixed-position warning indicator lights or mirrors that enable the spotting of vehicles that might result in collision have a fundamental weakness due to the fact that they draw a viewer's attention away from the actual object that the viewer might collide with. In high-stress situations such as panic or traffic, such approaches may be missed or misinterpreted by the viewer.

A system implementing an intuitive occluded object indicator, as described in this specification, may reduce the number or seriousness of collisions at critical locations. By displaying a dynamic representation of potential objects of collision such that at any point in time an object is portrayed in such a way so as to emulate the directionality and relative size at which the object would appear to a respective observer if there were no occlusion, an observer's attention is directed to the actual objects. Furthermore, such a dynamic representation does not induce distortions or mislead the observer. In response to viewing the dynamic representation, an observer may take appropriate action to avoid collisions, thus improving road, intersection or crossing safety.

In some implementations, a system implementing an intuitive occluded object indicator, as described in this specification, provides different views of multiple occluded objects to different observers of the occluded object indicator. By enabling different observers to each see a respective indication of occluded objects, more observers can be made aware of occluded objects, thus improving the effectiveness of the system.

In some implementations, a system implementing an intuitive occluded object indicator, as described in this specification, can implement techniques, e.g., machine learning techniques, to determine which objects to display on an occluded object indicator, and how to display the objects. By filtering irrelevant objects the system may be computationally more efficient. For example, irrelevant objects may not be rendered or rendered at a low resolution/quality, thus reducing the computational resources required by the system. In addition, such techniques can enable the system to learn patterns, such as common collision situations, reducing a number of computations performed by the system at runtime.

In some implementations, a system implementing an intuitive occluded object indicator, as described in this specification, may be configured to detect impending collisions. Information relating to detected impending collisions can be provided to assist in identifying dangerous or otherwise troublesome locations. Identified dangerous or otherwise troublesome locations may be shared with other parties, e.g., roadway managers or directly with vehicles approaching the location but not yet within visible range, and used to improve road and vehicle safety.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

FIG. 2 depicts an example overhead view of a scene that includes an intuitive occluded object indicator.

Like reference symbols in the various drawings indicate like elements.

DETAILED DESCRIPTION

This specification describes a system for providing a display that creates a dynamic representation of the potential objects of collision to one or more viewers. The dynamic representation may be provided by, for example, a flexible sheet of fabric, vinyl, or other material that can be draped on an occluding barrier, e.g., a fence or wall. The system can use a set of directional lighting elements so that a single display can concurrently present different representations to viewers at different locations. The dynamic representation is rendered based on knowledge of people and moving objects in the vicinity that is gathered through a system of sensors.

The dynamic representation is rendered such that at any point in time an object is portrayed in such a way so as to emulate the directionality, e.g., direction of movement, and relative size at which the object would appear to a respective viewer if there were no occlusion. For example, the direction in which an occluded object moves relative to a viewer, e.g., as represented by a trajectory in three dimensional space, is realistically emulated on the display.

Figure 1A:
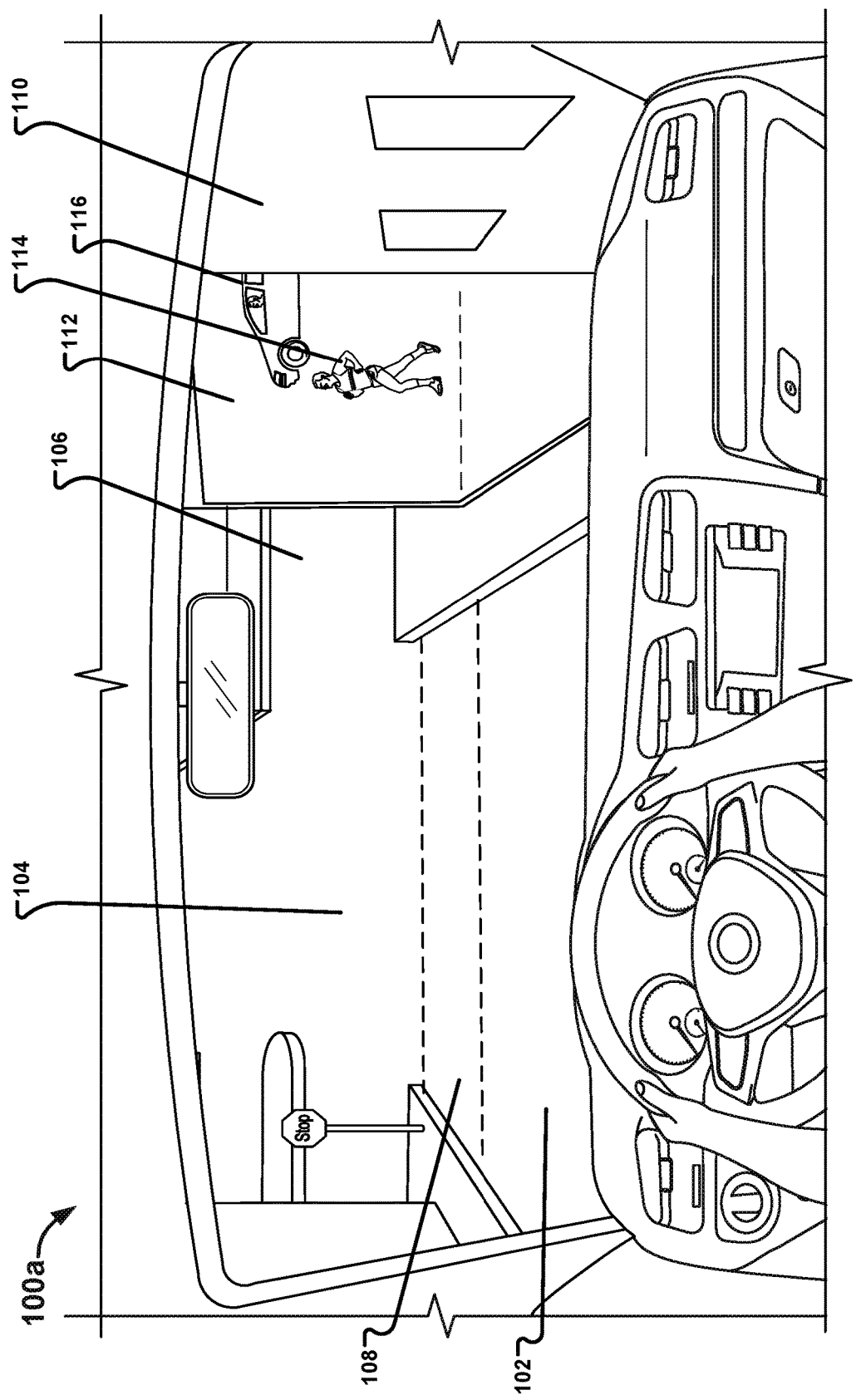
FIGS. 1A and 1B depict example scenes that include an intuitive occluded object indicator.
Figure 1B:
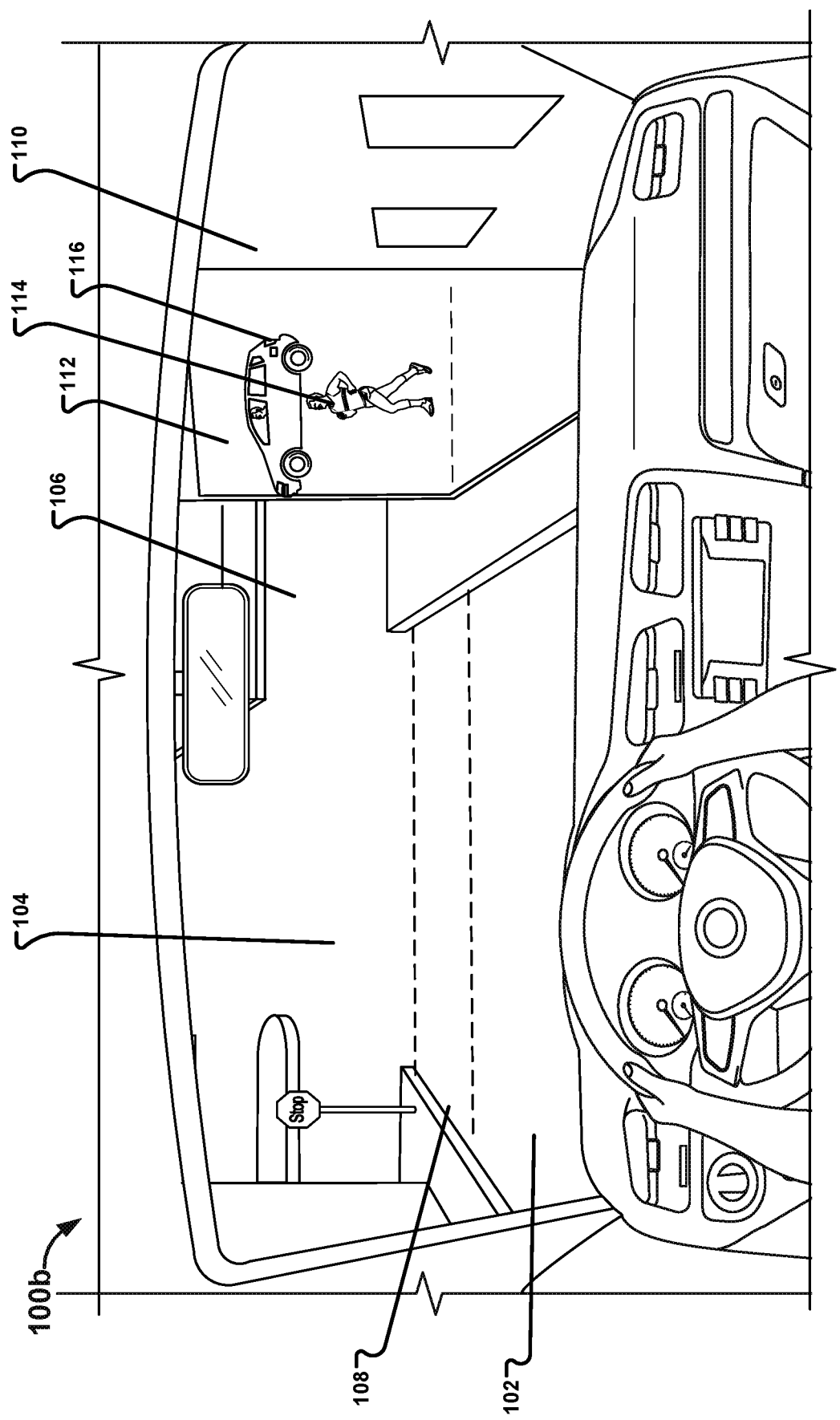

FIGS. 1A and 1B show example scenes that includes an intuitive occluded object indicator, also referred to herein as display 112. FIG. 1A shows the example scene 100a at time $T_1$, and FIG. 1B shows the example scene 100b at a later time $T_2$. The example scenes 100a, 100b show views from the perspective of an observer of the intuitive occluded object indicator. For example, the observer may be a driver of an automobile that is travelling along a road 102.

The observer is approaching an intersection 104 where a second road 106 joins road 102. A pedestrian crossing 108, e.g., a zebra crossing, is located at the intersection 104. A building 110 is also located near the intersection. The building 110 acts as a barrier that obstructs the observer's view of objects on the road 106. The obstruction of the observer's view of the objects on the road 106 can result in collisions. For example, a pedestrian approaching the intersection 104 may immediately enter the pedestrian crossing 108. Without warning, the observer may struggle to brake in time, resulting in a collision.

As shown in FIGS. 1A and 1B, a display 112 is located between the observer and the building 110. For example, the display 112 may include an array of light emitting diodes on a flexible backing that has been hung from or otherwise attached to building 110. The display 112 shows a representation or indication of objects that are occluded by the building 110, e.g., objects traveling on the road 106 that cannot be seen by the driver traveling on road 102. For example, as shown in the example scene 100a, a person 114 may be jogging on a sidewalk of road 106 in the direction of the intersection 104. In addition, an automobile 116 may be travelling on the road 106 in the direction of the intersection 104. Both the person 114 and the automobile 116 are represented on the display 112 at times $T_1$ and $T_2$.

The representations of objects shown on the display 112 are rendered dynamically such that, at any point in time, objects occluded by the building 110 are portrayed to emulate a directionality and size at which the objects would appear to the observer if there were no occlusion. For example, in the example scene 100a the display 112 indicates that a jogger 114 is approaching the intersection 104. The display 112 also indicates that an automobile 116 is approaching the intersection 104. The sizes of the representations of the jogger 114 and the automobile 116 appear realistic to an observer of the display 112. For example, the size of the representations of the jogger 114 may increase as the jogger 114 approaches the intersection 104, and/or as the observer approaches the intersection, since the distance between the jogger 114 and the observer is then decreased.

The directionality, e.g., the direction of movement, of the representations of the jogger 114 and the automobile 116 emulates the directionality of the jogger 114 and the automobile 116. For example, at time $T_2$ the jogger 114 has moved along a sidewalk in the direction of the intersection 104 and is closer to the intersection 104 than at time $T_1$, reflecting the movement of the jogger 114 that has occurred between time $T_1$ and time $T_2$. Similarly, at time $T_2$ the automobile 116 has moved along the road in the direction of the intersection 104 and is closer to the intersection 104 than at time $T_1$, reflecting the movement that has occurred between time $T_1$ and time $T_2$.

In some cases, representations of objects occluded by the building 110 shown on the display 112 can be coarse-grained. For example, the representations of the objects may be shown at a low resolution or represented using light strips. In some implementations, a symbol, outline, or other rough indicator of the object can be provided. In other cases, representations of occluded objects shown on the display 112 can be fine-grained. For example, the representations of the objects may be shown at a high resolution and include details of an object's appearance.

In some cases, a representation of occluded objects may be rendered to show elements not present in the physical environment. For example, the representation of the objects may include augmented reality indicators such as a warning to highlight that a car is quickly approaching the intersection 104 from the road 106. In some cases a representation of objects occluded by the building 110 may be enhanced through artificial colouring, flashing, or other visual effects. For example, a car that is approaching the intersection 104 from the road 106 may be represented on the display by a bright, flashing icon of a car. Example displays are described in more detail below with reference to FIGS. 7A-7D.

The dynamic representation of objects that are occluded by the building 110 is rendered based on knowledge of people and other objects in the vicinity of the building 110. For example, knowledge of people and other objects may be obtained using a system of sensors located on either side of the building 110, e.g., the side facing the road 102 and the side facing the road 106. Systems for generating dynamic representations of occluded objects are described in more detail below with reference to FIGS. 3 and 4.

FIG. 2 depicts an example overhead view 200 of a scene that includes an intuitive occluded object indicator. The example overhead view 200 includes a barrier 202 that obstructs the view of objects 204, 206 and 208 to viewers 210 and 212. A display 214 is located between the viewers 210, 212 and the barrier 202. The cross 220 indicates a potential collision site, e.g., between the viewer 212 and the occluded object 204.

In some implementations, the barrier 202 may be stationary. For example, as described above with reference to FIG. 1, the barrier may be a building. In other examples the barrier may be a construction site, woodland or a wall. In these examples, the objects 204, 206 and 208 may include but are not limited to people, cyclists or vehicles. For example, the objects 204 and 206 may be vehicles travelling along a road, cyclists travelling along a cycle path or people walking or running along a path. Similarly, the viewers 210 and 212 may include people inside vehicles, people riding bikes or people walking/running. For example, the viewers 210 and 212 may be cyclists travelling along a cycle path that is perpendicular to a cycle path on which the objects 204 and 206 are travelling. The cross 220 indicates a potential collision between the cyclists 204 and 212.

In some implementations, the barrier 202 may be mobile. For example, the barrier may be a school bus or other form of public transport. In this example, the objects 204, 206 and 208 may include, but are not limited to, children and parents. For example, the objects 204, 206 and 208 may be children that have left the bus and are now travelling by foot. As described above, the viewers 210 and 212 may include people inside vehicles, people riding bikes or people walking/running. For example, the viewers 210 and 212 may be cyclists travelling along a cycle path that is perpendicular to a bus stop where the children 204 and 206 are exiting the bus. The cross 220 indicates a potential collision between the child 204 and the cyclist 212.

As described above with reference to FIG. 1, the display 214 shows a representation or indication of objects occluded by the barrier 202. In some implementations, the display 214 may show a representation or indication of all objects occluded by the barrier 202. In other implementations, the display may show a representation or indication of one or more objects occlude by the barrier. For example, the display 214 may not show an indication of the objects 206 and 208, since the object 206 is moving away from the observers 210 and 212 and does not pose a collision risk. Similarly, the object 208 may be a stationary object that also does not pose a collision risk. A set of objects occluded by a barrier can be filtered, and a filtered set of objects can be selected to be indicated on a display located between the barrier and an observer. These techniques are described in more detail below with reference to FIGS. 4 and 5.

The display 214 is configured to concurrently show different views of objects occluded by the barrier 202 to each viewer of the display 214. For example, a first viewer of the display 214 may be shown a first view of objects occluded by the barrier, whereas a second viewer of the display may be shown a second view of objects occluded by the barrier. The display can provide these differing views with directional lighting elements so that the first viewer does not see the view shown to the second viewer, and the second viewer does not see the view shown to the first viewer. Each viewer can be presented an indicator of an occluded object that has the same or similar position, trajectory, and apparent size that the viewer would see if the barrier were not present. In other words, the display may provide a perspective projection view that simulates or approximates the view of the object that the viewer would have had if the barrier were absent.

In some implementations, each different view of objects occluded by the barrier corresponds to an intersection of (i) a three-dimensional (3D) space between the respective viewer's field of vision and the objects, and (ii) the display 214. For example, the view of object 204 occluded by the barrier 202 shown to the viewer 210 corresponds to an intersection of 3D space between the viewer's field of vision 222 and the object 204, and the display 214. Similarly, the view of object 204 occluded by the barrier 202 shown to the viewer 212 corresponds to an intersection of 3D space between the viewer's field of vision 224 and the object 204, and the display the 214.

For example, in the example overhead view 200 the display shows a representation or indication of the occluded object 204 to the multiple viewers 210 and 212. The viewer 210 is shown the representation or indication 216 of the object 204. The viewer 212 is shown the representation or indication 218 of the object 404. The representation 216 may not be visible to the viewer 212. Similarly, the representation 218 may not be visible to the viewer 210. As described above with reference to FIG. 1, both of the representations 216 and 218 emulate a directionality, e.g., direction of movement, and size at which the object 204 would appear to the respective viewers 210 and 212 if there were no occlusion.

For convenience, one display 214 is shown in FIG. 2. However, in some implementations, an environment may include multiple displays. For example, the example overhead view 200 could include an additional display around the corner to assist viewers approaching the intersection along the other side of the building. The display on the other side would perform an inverse of the display 214—that is the occluded objects 204, 206 and 208 could become viewers of a second display that provides an indication of occluded objects on the other side of the barrier, e.g., observers 210 and 212.

Figure 3:
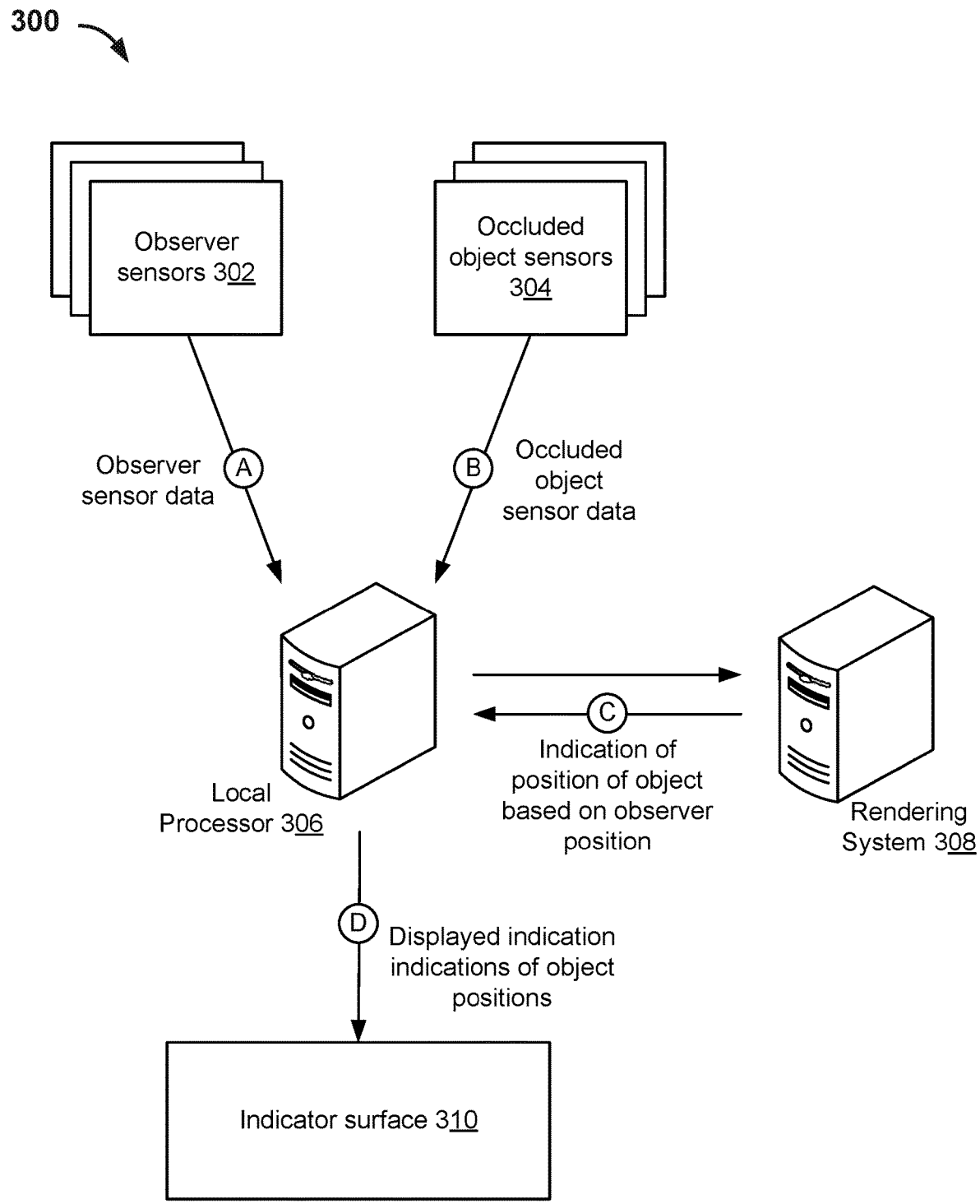
FIG. 3 depicts a conceptual block diagram of an example system for displaying an indication of a position of an occluded object on an indicator surface.

FIG. 3 depicts a conceptual block diagram 300 of an example system for displaying an indication of a position of an occluded object on an indicator surface. The system 300 can be enabled to receive observer sensor data and occluded object sensor data. The system 300 may generate an indication of the position of occluded objects using the received data. The generated indication may be provided for display on an indicator surface. Generally, the system 300 can be implemented as a system of components with physical hardware like that described with respect to FIG. 4 below. The system 300 may include one or more computers that operate across one or more locations.

Briefly, the system 300 includes observer sensors 302, occluded object sensors 304, a local processor 306, a rendering system 308 and an indicator surface 310 (also referred to as a "display.") The components of the system 300 can exchange communications over one or more networks, or can exchange communications in another way, such as over one or more wired or wireless connections. As depicted in FIG. 3, a process for displaying an indication of a position of an occluded object on an indicator surface can be performed by the system 300.

During stage (A) of the process for displaying an indication of a position of an occluded object on an indicator surface, the local processor 306 receives observer sensor data from observer sensors 302. For example, the local processor 306 may receive data representing a first video showing a first scene of an environment taken by a camera located in the environment. The first scene may include one or more observers of the indicator surface or display that is located between the one or more observers and a barrier, e.g., the observers 210 and 212 of the display 214 described above with reference to FIG. 2. As another example, the local processor 306 may receive data representing the detection of one or more observers of a display in an environment in which motion sensors are located. In some implementations, the observer sensor data includes data identifying the positions and velocity of detected observers.

During stage (B) of the process for displaying an indication of a position of an occluded object on an indicator surface, the local processor 306 receives occluded object sensor data from the occluded object sensors 302. For example, the local processor 306 may receive data representing a second video showing a second scene of an environment taken by a camera located in the environment. The second scene may include one or more objects that cannot be seen by observers in the first scene described above due to the barrier described above, e.g., the objects 204, 206 and 208 that cannot be seen by the observers 210 and 212 due to barrier 202 described above with reference to FIG. 2. As another example, the local processor 306 may receive data representing the detection of one or more objects in an environment that cannot be seen by observers due to a barrier from motion sensors located in the environment. In some implementations, the occluded object data includes data identifying the positions, velocity and/or size of detected objects.

During operation, the local processor 306 transmits the received observer sensor data and occluded object sensor data to the rendering system 308. The rendering system 308 receives the transmitted data and analyzes the data.

For example, in some implementations, the rendering system 308 may receive a first video showing a first scene of an environment taken by a camera located in the environment, as described above, and may analyze the first video to determine a position and directionality of observers of a display. In some implementations, the rendering system 308 may analyze the first video to detect one or more observers of a display and to determine a predicted trajectory of each observer. For example, the rendering system 308 may analyze a video of a road to identify vehicles using the road and to determine dynamic positions of vehicles travelling in a particular direction, e.g., towards a potential collision site.

As another example, in some implementations, the rendering system 308 may receive a second video showing a second scene of an environment taken by a camera located in the environment, as described above, and may analyze the second video to detect objects included in the video and to determine properties of the detected objects. For example, the rendering system may detect objects included in the video using object recognition software. The rendering system may then determine positions of detected objects, a directionality of detected objects, sizes of detected objects, or potential trajectories of detected objects. In some cases the rendering system may access one or more external databases to determine such properties, e.g., a database describing standardized object sizes or average speeds. For example, the rendering system may use object recognition software to detect a car as an object appearing in a video and access an external database to determine exact dimensions of the detected car.

Based on analyzing received data, the rendering system 308 generates an indication of a position of an occluded object based at least in part on a determined position of an observer of the display. As described above with reference to FIGS. 1 and 2, the generated indication is rendered dynamically such that at any point in time, objects occluded by the barrier are portrayed so as to emulate a directionality and size at which the objects would appear to the observer if there were no occlusion. In addition, as described above with reference to FIG. 2, the generated indication may be rendered dynamically such that different views of objects occluded by the barrier are displayed concurrently based on respective positions of multiple observers.

The type of indication generated by the rendering system 308 is dependent on a number of factors, including but not limited to the types of objects detected, system hardware, likelihood of collision between detected observers and objects, current weather conditions or time of day. For example, in some implementations, the rendering system 308 may detect a set of occluded objects and filter the set of objects in order to determine a subset of detected objects to include in the generated indication. Filtering the set of objects can include, for example, removing objects that have not moved more than a predetermined minimum amount over a period of time. In this manner, stationary objects or objects that pose a low risk of collision are not included in the generated indication. In some implementations, the rendering system 308 may detect a set of occluded objects and generate, for each object in the set of occluded objects, a relevance score indicative of a predicted relevance of the object to an observer whose view of the object is obstructed by the barrier. Based on the generated relevance scores, the rendering system 308 may filter the set of occluded objects to generate a subset of occluded objects. Generating relevance scores for occluded objects is described in more detail below with reference to FIG. 6.

During stage (C) of the process for displaying an indication of a position of an occluded object on an indicator surface, the rendering system 308 transmits data representing the generated indication of the position of the occluded object to the local processor 306. The local processor receives the data representing the generated indication of the position of the occluded object. During stage (D) of the process, the local processor 306 causes the data representing the generated indication of the position of the occluded object to be displayed on the indicator surface 310. Example displays showing generated indications of occluded objects are illustrated below with reference to FIGS. 7A-7D.

Figure 4:
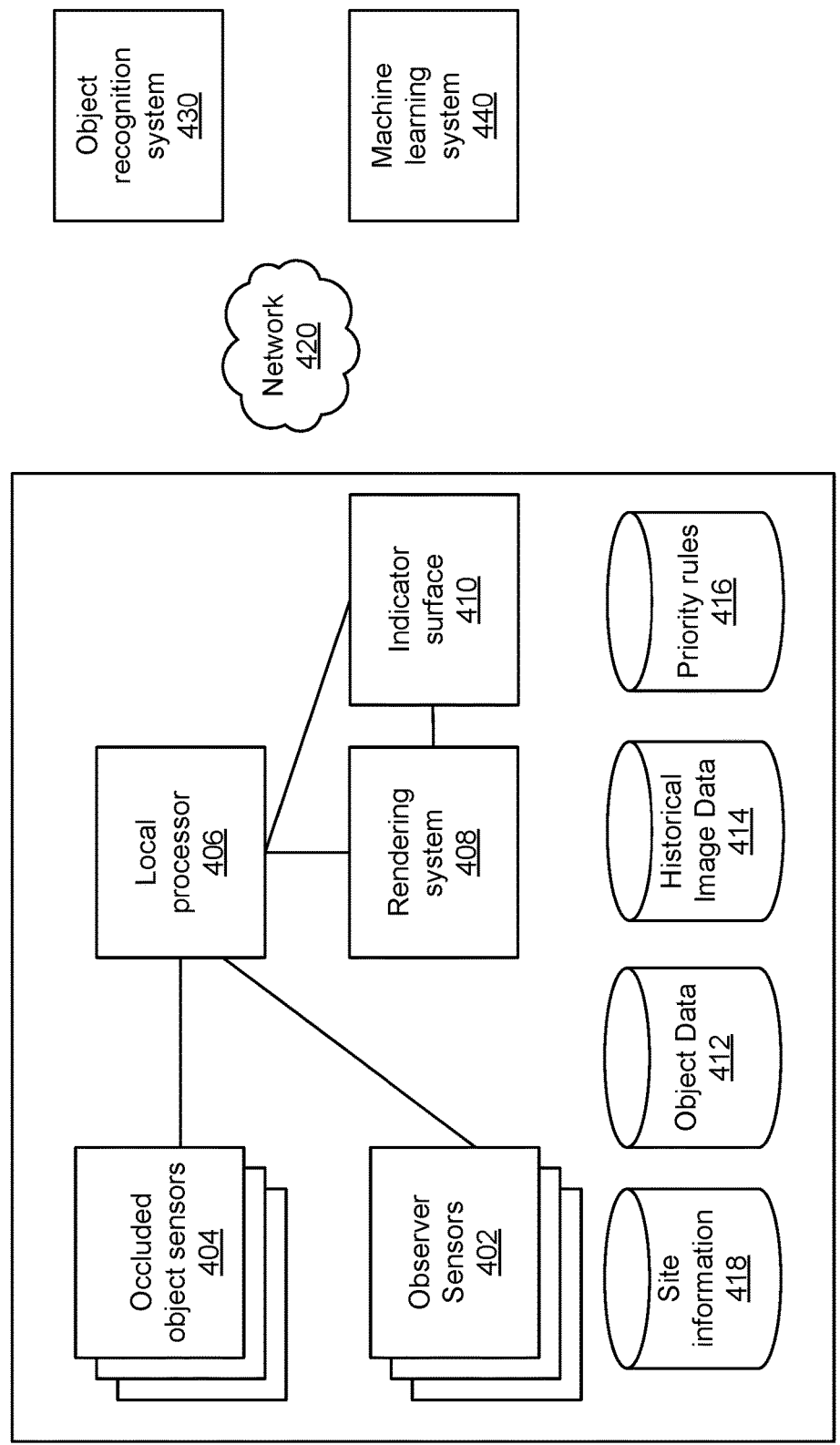
FIG. 4 depicts an example system for displaying an indication of a position of an occluded object on an indicator surface.

FIG. 4 depicts an example system 400 for displaying an indication of a position of an occluded object on an indicator surface. The system 400 includes observer sensors 402, occluded object sensors 404, local processor 406, rendering system 408 and indicator surface 410. The rendering system 408 may communicate with one or more databases, e.g., an object data database 412, historical image data database 414 or priority rule database 416. Optionally, the system 400 may further include an object recognition system 430 and a machine learning system 440. In some implementations, a network 420, such as a local area network (LAN), wide area network (WAN), the internet, or a combination thereof, connects one or more of the components of the system 400.

The observer sensors 402 include one or more devices capable of detecting observers of indicator surface 410, e.g., people or moving vehicles. For example, the observer sensors 402 may include one or more of video cameras, stereo-cameras, lidar, Tango-type units, radar, magnetic sensors, radio frequency signal detectors, reflective sound imagers or other sensors. The observer sensors 402 may be positioned so as to monitor a space of potential motion paths, e.g., along a portion of the road 102 approaching the intersection 104 as described above with reference to FIG. 1.

The occluded object sensors 404 include one or more devices capable of detecting objects that are occluded to observers of the indicator surface 410. Example objects include people, vehicles, cyclists or other moving objects. The occluded object sensors 404 may include one or more of video cameras, stereo-cameras, lidar, Tango-type units, radar, magnetic sensors, radio frequency signal detectors, reflective sound imagers or other sensors. The occluded object sensors 404 may be positioned so as to monitor a space of potential motion paths, e.g., along a portion of the road 106 approaching the intersection 104 as described above with reference to FIG. 1.

In some implementations, the observer sensors 402 and the occluded object sensors 404 may be included in a single unit that is configured to view an entire space, e.g., a space encompassing viewers and objects. For example, a single unit may be mounted at an overhead position that has visibility to motion paths of observers and of objects.

In some implementations, the observer sensors 402 and the object sensors 404 may include features that improve or assist functionality in poor lighting conditions, e.g., at night or during bad weather. For example, in some cases the observer sensors 402 and the object sensors 404 may include additional lighting, infrared lighting features, ultrasonic sensors, Doppler passive acoustic sensors, radio frequency sensors, infrared lidar sensors, or other types of sensors. In some cases the observer sensors 402 and the object sensors 404 may be used to implement a machine learning sensor fusion approach to validating the presence of objects. For example, the observer sensors 402 and occluded object sensors 404 may include microphones or accelerometers that may assist in detecting the presence of observers or objects. As another example, the environment in which the observer sensors 402 and occluded object sensors 404 are located may further include microphones or accelerometers that may support the observer sensors 402 and occluded object sensors 404 in providing information to the local processor 406.

The local processor 406 may be configured to receive, store or process data received from the observer sensors 402 and the occluded object sensors 404. For example, the local processor 406 may be a computing device, such as a server. In some implementations, the local processor 406 may be configured to receive data from the observer sensors 402 and the occluded object sensors 404 and determine positions of observers or occluded objects that have been detected by the sensors. For example, the local processor 406 may include or communicate over the network 420 with an object recognition system 430 that may be used to detect objects and/or observers in received sensor data.

The rendering system 408 may be configured to generate, based at least in part on determined positions of observers and objects, an indication of a position of an occluded object on the indicator surface 410. The generated indication of a position of an occluded object is rendered dynamically such that at any point in time, objects occluded by the building are portrayed so as to emulate a directionality and size at which the objects would appear to the observer if there were no occlusion.

To generate an indication of a position of an occluded object that emulates a direction of movement and size at which the objects would appear to the observer if there were no occlusion, the rendering system 408 may be configured to apply various transformations to data obtained by the observer sensors 402 and occluded object sensors 404. For example, the rendering system 408 may use the observer sensors 402 to determine a location of an observer of the display, e.g., by analyzing data representing a first video taken by an observer sensor. The rendering system 408 may further use occluded object sensors 404 to detect a location of occluded objects and to determine a size of occluded objects, e.g., by analyzing data representing a second video taken by an occluded object sensor.

The rendering system 408 may be configured to identify edges of an occluded object and may use the identified edges to define multiple lines from the determined location of the observer to identified edges of an occluded object. For example, if the occluded object is an automobile, the rendering system 408 may define four lines—one from the determined location of the observer to the front most edge of the automobile, one from the determined location of the observer to the back most edge of the automobile, one from the determined location of the observer to the top most edge of the automobile and one from the determined location of the observer to the bottom most edge of the automobile. The defined lines may be used to determine a size or dimensions of the occluded object. For example, the lines from the determined location of the observer to the front and back most edges of the automobile may be used to represent a width of the automobile.

Based on a known location of the display, the rendering system 408 may then calculate an intersection of the defined lines with the display, e.g., the two dimensional plane of the display. The rendering system may then generate a representation of the occluded object, e.g., a low resolution representation or high resolution representation, to display on the display at the calculated intersection. The size of the generated representation of the occluded object may be scaled according to the size of the calculated intersection.

The defined lines may correspond to the visual geometric extremes of an object from an observer's perspective. For example, considering the rectangular visual envelope of object 204 from the perspective of viewer 210, the horizontal extremes of the object 204 as perceived by the viewer 210 would be the top left corner of the rectangle 204 and the bottom right corner of the rectangle 204. The vertical components of the visual envelope, not shown in FIG. 2 due to the overhead perspective, may be a point representing the bottom of the object 204, and a point at some height above that could correspond to a maximum height of the object. These extreme points may be sued to define four points in 3D space from which four lines are drawn to the viewer 210. The intersection of these four lines with the display surface 214 may define the shape and size of the object 204 as it may be represented on the display 214.

When displayed on the indicator surface 410, the generated indication moves on the indicator surface 410 and changes in size to emulate a view of the object that the observer would have if the barrier were not present. For example, at any given time, the position and size of the generated indication shown on the indicator surface 410 corresponds to the intersection of the indicator surface and a 3D solid space encompassing all points between the observer's eyes and the object.

In some implementations, the rendering system 408 may be configured to generate an indication of a position of an occluded object by generating relevance scores for each of multiple occluded objects. The relevance scores may be indicative of a predicted relevance of an object to an observer whose view of the object is obstructed by a barrier. For example, an occluded vehicle that is approaching an intersection at speed may be assigned a higher relevance score than a pedestrian walking towards the intersection, since the vehicle approaching at speed is likely to be more relevant (e.g., represents a greater risk of collision) to an observer approaching the intersection from another direction. As another example, a child running in front of a stationary bus at a bus stop may be assigned a higher relevance score than a second child walking away from the bus along a pavement, since the running child is likely to be more relevant to an observer, e.g., a driver of a car, which is overtaking the stationary bus. Since different observers have different speeds and locations, and so different occluded objects may be relevant to the different observers. A set of relevance scores can be determined for each observer, allowing the most relevant objects for each individual observer to be selected.

Relevance scores generated by the rendering system 408 may depend on one or more of (i) a size of the object, (ii) a shape of the object, (iii) movement of the object, (iv) a trajectory of the object, (v) proximity of the object to the barrier, (vi) an image recognition score for the object, (vii) a position of the observer, (viii) a trajectory of the observer, (ix) a measure of the observer's ability to brake or change trajectory, (x) historical data indicating objects in proximity to the barrier, (xi) historical data indicating similar types of barriers, or (xii) capabilities of the object, e.g., maneuverability or stopping distances.

For example, the rendering system 408 may communicate with an object recognition system 430 to determine a size or shape of a detected object. In some implementations, a large object, e.g., a vehicle, may be assigned a higher relevance score than a small object, e.g., a cat. In addition, the rendering system 408 may receive an image recognition score for images recognized by the object recognition system 430. An image recognition score may represent a certainty that a recognized image has been correctly identified. In some implementations, an object with a higher image recognition score may be assigned a higher relevance score than an object with a low image recognition score.

As another example, the rendering system 408 may access object data stored in an object database 412 to determine a size, shape or movement of a detected object. In some implementations, an emergency services vehicle, e.g., an ambulance, may be assigned a higher relevance score than a standard vehicle, e.g., a car.

As another example, the rendering system 408 may be configured to determine a predicted trajectory of an occluded object and/or a predicted trajectory of an observer. In some implementations, an object whose predicted trajectory collides with the predicted trajectory of an observer may be assigned a higher relevance score than an object whose predicted trajectory does not collide with the predicted trajectory of the observer.

As another example, the rendering system 408 may access priority rules stored in a priority rule database 416 to generate a relevance score for a detected object. In some implementations, priority rules included in the priority rules database 416 may include rules that prioritize a relevance of one object over another. In some implementations, a priority rule in the priority rule database 416 may indicate that an object that is closer to the barrier is more relevant to an observer than an object that is further away from the barrier. In some implementations, a priority rule may indicate that an object that is within a predetermined distance from a potential point of collision or from a barrier is highly relevant to an observer.

As another example, the rendering system 408 may be configured to generate a relevance score for an object based on a positon of the observer or a measure of the observer's ability to brake or change directions. In some implementations, the relevance score for an object determined in relation to an observer who is further away from a potential collision site may be lower than a relevance score for the same object determined in relation to an observer who is closer to the potential collision site. In some implementations, relevance scores for object may be increased when an observer has a low predicted ability to brake or change directions, e.g., low maneuverability, while relevance scores may be decreased when generated for an observer who has a high predicted ability to brake or change directions.

In some implementations, the rendering system 408 may be configured to access site information stored in a site information database 418 to generate a relevance score for an occluded object. For example, the site information database may include a 3D model or other site survey of an area surrounding the barrier and indicator surface. In some implementations, the rendering system 408 may use information in the site information database to adjust or assign relevance scores to an occluded object. For example, if an object is travelling at significant speed on a trajectory towards a potential collision site, but the 3D model indicates that a hedge or wall will force the object to change directions and avoid the potential collision site, the rendering system 408 may reduce an assigned relevance score or assign the object a low relevance score.

In some implementations, the rendering system 408 may be configured to generate an indication of a position of an occluded object by applying machine learning techniques. For example, rendering system 408 may be configured to communicate with machine learning system 440 in order to identify relevant objects.

The machine learning system 440 may be a system based on a neural network architecture. The machine learning system 440 may be used by the system 400 to learn which types of objects or properties of objects are relevant to an observer. For example, certain environments may exhibit similar collision patterns and suffer from similar collision risks, e.g., similarly structured intersections or similarly located bus stops. In these cases, the machine learning system 440 may be trained to learn what types or properties of objects may be relevant to an observer. For example, the machine learning system 440 may learn that bicycles approaching an intersection at speed are highly likely to quickly turn a corner directly before reaching the intersection. Therefore, even though a bicycle may be travelling at speed on a trajectory towards a potential collision point, the system can assign a lower relevance score to the bicycle than, say, a car travelling at a similar speed on a similar trajectory. In addition, if a system for displaying an indication of a position of an occluded object on an indicator surface is applied to a new environment that is similar to a previously seen environment, the rendering system 408 may more efficiently generate indications of relevant occluded objects.

In some cases the machine learning system 440 may be deployed with a pre-trained model. The original model may be generated from test installations of the system 400. For example, test installations of the system 400 may be used to collect sensor data. The sensor data may be analyzed and instances where it is determined that a detected object should be displayed on a display may be identified, e.g., by human labelling. The model may then be generated through a training process based on the labelled sensor data. In examples where the model is a neural network model, training the model may include optimizing the weights of the neural network. In some cases the machine learning system 440 may be trained on training data that includes parallel data streams established from (i) trusted ground truth data (e.g., data from human observations such as video data or offline computer analysis of data from highly capable sensor systems that have been externally validated), and (ii) data from deployable sources (e.g., rugged, low-power, low-cost sensors), in order to establish a probability determination of how data from the various deployable sensors may correspond to ground truth events.

In some cases multiple machine learning systems 440 may be run at a particular location. For example, a first machine learning system may be configured to monitor incoming traffic and determine corresponding objects to display on the display. A second machine learning system may be configured to monitor past events to determine whether the events were high risk events or low risk events. The second machine learning model may be used to generate new labelled training data which could be used to train or fine tune other machine learning models.

Rendering system 408 may be configured to transfer information to the indicator surface 410 that represents the determined indication of a position of an occluded object. In some implementations, the rendering system 408 may communicate directly with the indicator surface 410. In other implementations the rendering system 408 may transfer information to the indicator surface via local processor 406.

The Indicator surface 410 displays received indications of positions of occluded objects. The indicator surface 410 may be located between detected observers and the barrier. For example, the indicator surface 410 may be draped or otherwise attached to the barrier itself.

In some implementations, the indicator surface 410 may include a light generating display, a reflective display or a projection display. For example, the indicator surface 410 may include an array of light emitting diodes (LEDs) on a flexible surface, e.g., fabric or vinyl, coupled into a series of optics that enable digitally controlled directionality of an image displayed on the indicator surface. For example, in some implementations, a single pixel on the indicator surface may be represented by multiple LEDs, e.g., twenty LEDs that each output light at a different angle. In this manner, the indicator surface may provide different images to multiple observers, with each image emulating a view of an object that an observer would have if a barrier were not present. In some implementations, the indicator surface 410 may include programmable directionality to the light output, e.g., as in a light-field display or stereoscopic display, to provide different images to multiple viewers with reduced cross-talk.

In some implementations each pixel represented by the indicator surface 410 may include a closely spaced cluster of LEDs, e.g., a cluster of LEDs with at least 0.1 mm spacing, on a flat surface behind a single optical element, e.g., a lens, such that the angle between the surface normal to the LED and the lens varies—leading to different emission directions for each LED. In some cases the LEDs may be positioned on a curved surface, yielding a flat outer surface of the optical element.

In some implementations the indicator surface 410 may be a low-resolution indicator surface with larger clusters of LEDs. For example, the LEDs may be grouped in surface-mount packages with spacing between the LEDs between 1-3 mm. In this example, inter-cluster distances may be between 1 cm and 5 cm. Such clusters of LEDs may be embedded into a graphical backing, e.g., a decorative vinyl printed sheet, that allows for a visually appealing or otherwise useful surface over which the indication information may be presented.

The indicator surface 410 may be configured to display decorative, advertising or other non-object indicating content when the system 400 determines that there is currently no collision risk.

Figure 5:
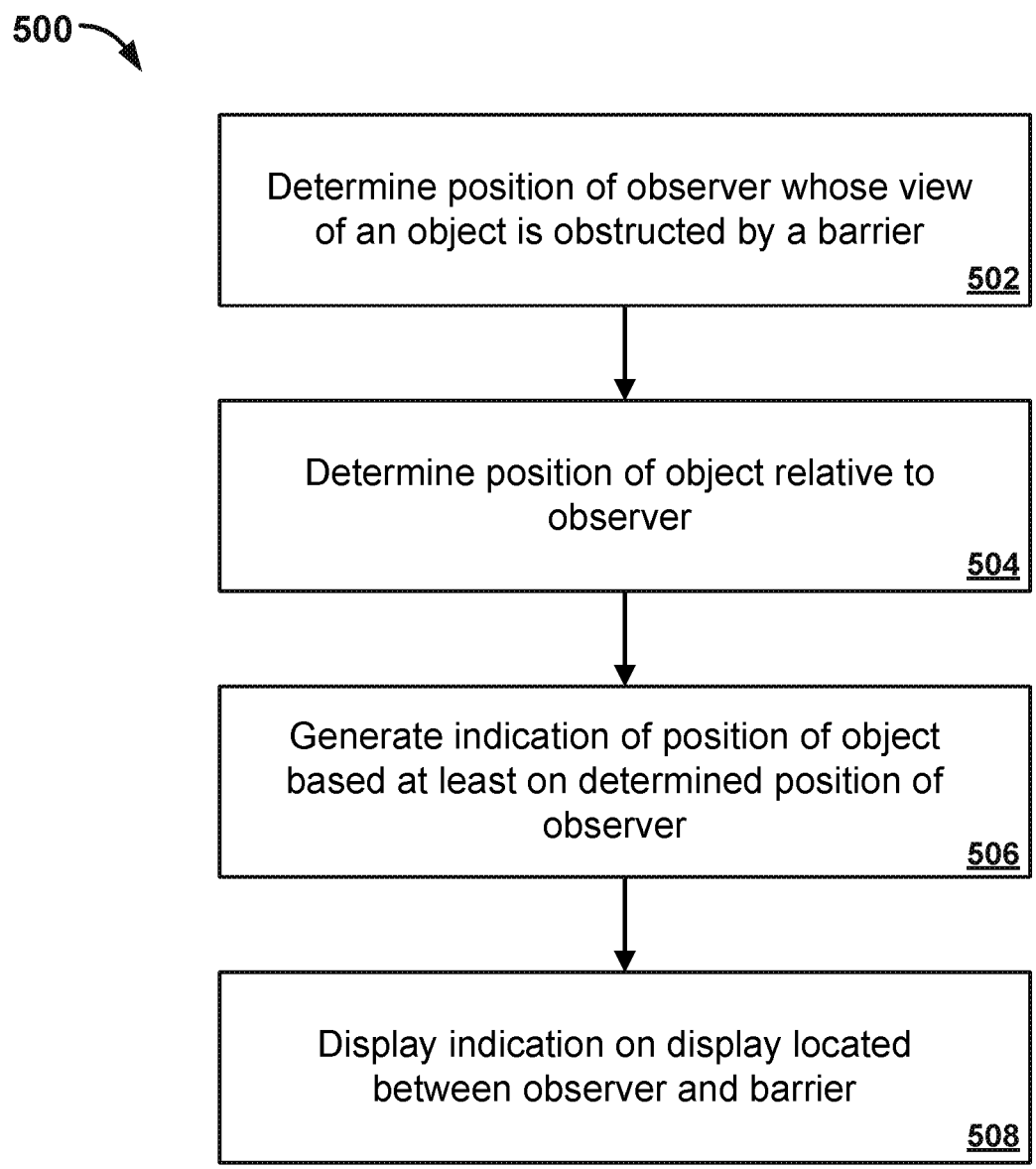
FIG. 5 depicts a flowchart of an example process for displaying an indication of a position of an occluded object on an indicator surface.

FIG. 5 presents an example process 500 for displaying an indication of a position of an occluded object on an indicator surface. For convenience, the process 500 will be described as being performed by a system including one or more computers located in one or more locations. For example, a system for displaying an indication of a position of an occluded object on an indicator surface, e.g., system 400 of FIG. 4, appropriately programmed, can perform the process 500.

The system determines a position of an observer whose view of an object is obstructed by a barrier (step 502). In some implementations, the barrier is a stationary barrier, e.g., a building or construction site. For example, as illustrated above with reference to FIG. 1, the system may determine a position of an observer who is driving a vehicle along a road and approaching an intersection. Due to a barrier at the intersection, e.g., a building or construction site on the corner of the intersection, the observer may not be able to view objects, e.g., other vehicles or pedestrians, which are also approaching the intersection from behind the barrier. In other implementations the barrier is mobile, e.g., a bus or other vehicle. For example, the system may determine a position of an observer who is driving a vehicle along a road and approaching a bus stop. Due to a school bus that has stopped at the bus stop, the observer may not be able to view objects, e.g., children, that are exiting the bus and potentially walking out in front of the bus to cross the road.

In some implementations, the system determines respective positions of multiple observers whose respective views of the object is obstructed by the barrier. For example, the system may determine a respective position of each observer driving a vehicle along a road, of each pedestrian walking along a sidewalk, or of each cyclist using a cycle path. As described above with reference to FIGS. 3 and 4, in some implementations, the system may use one or more sensors that capture observer data. Observer data may be used in combination with an object recognition system or data relating to detected objects stored in a database to determine respective positions of multiple observers.

The system determines a position of the object relative to the observer (step 504). In some implementations, the system determines a position of an observer whose view of multiple objects is obstructed by a barrier at step 502. In this case, the system determines, for each of the multiple objects, a position of the object relative to the observer. As described above with reference to FIGS. 3 and 4, in some implementations, the system may use one or more sensors that capture occluded object data. Occluded object data may be used in combination with an object recognition system or data relating to detected objects stored in a database to determine, for each of the multiple objects, a position of the object relative to the observer.

The system generates an indication of the position of the object based at least in part on the determined position of the observer (step 506). As described above with reference to step 504, in some implementations, the system may determine a position of an observer whose view of multiple objects is obstructed by a barrier. In these cases the system generates, for one or more of the multiple objects, an indication of the position of the object based at least in part on the determined position of the observer. Generating an indication of the position of an object based at least in part on a determined position of an observer is described in more detail below with reference to FIG. 6.

In some implementations, the system augments the generated indication of the position of the object based at least in part on the determined position of the observer with context or emphasis information. For example, the system may include artificial colouring, flashing, instructions, symbols, warnings or other visual effects with the generated indication. Augmented generated indications as illustrated below with reference to FIGS. 7A-7D.

In some implementations, the system detects a set of objects behind the barrier at multiple times and filters, from the set of detected objects, objects that have not moved more than a predetermined minimum amount over a period of time. For example, the system may detect a dog tied to a lamppost, a person waiting at a bus stop or a parked car as an object occluded by the barrier. In these cases the system may filter such objects from the set of detected objects and not include the objects in the generated indication.

The system displays the indication of the position of the object on a display located between the observer and the barrier (step 508). For example, the display may be located on the barrier, e.g., on the side of a building or bus. As described above with reference to step 506, in some cases the system generates, for one or more of the multiple objects, an indication of the position of the object based at least in part on the determined position of the observer. In these cases the system displays the generated indications on a display located between the observer and the barrier.

As described above with reference to step 502, in some implementations, the system may determine respective positions of multiple observers whose respective views of the object is obstructed by the barrier. In these cases the system may concurrently display, on the display, different views of the object to each of the observers based on the determined respective positions of the multiple observers. As described above with reference to FIGS. 2-4, each different view of the object corresponds to an intersection of (i) a three-dimensional space between the respective observer's field of vision and the object, and (ii) the display. The system dynamically changes displayed indications of the position of objects as the position of the observers and objects changes.

Figure 6:
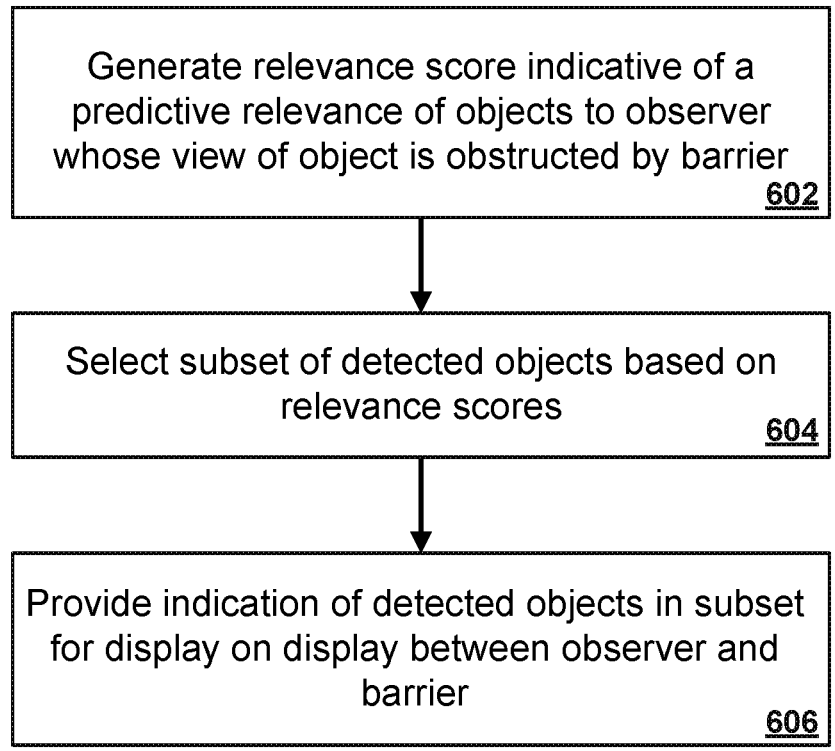
FIG. 6 depicts a flowchart of an example process for generating an indication of a position of an object based at least in part on a determined position of an observer.

FIG. 6 presents an example process 600 for generating an indication of a position of an object based at least in part on a determined position of an observer. For convenience, the process 600 will be described as being performed by a system of one or more computers located in one or more locations. For example, a system for displaying an indication of a position of an occluded object on an indicator surface, e.g., the system 400 of FIG. 4, appropriately programmed, can perform the process 600.

The system generates, for each of multiple objects, a relevance score indicative of a predicted relevance of the object to an observer whose view of the object is obstructed by the barrier (step 602). In some implementations, generating the relevance scores includes generating, for each of the multiple objects, a relevance score based on one or more of (i) a size of the object, (ii) a shape of the object, (iii) movement of the object, (iv) a trajectory of the object, (v) proximity of the object to the barrier, (vi) an image recognition score for the object, (vii) a position of the observer, (viii) a trajectory of the observer, (ix) a measure of the observer's ability to brake or change trajectory, (x) historical data indicating objects in proximity to the barrier, (xi) historical data indicating similar types of barriers, or (xii) capabilities of the object, e.g., maneuverability or stopping distances related to the object.

In some implementations, the system generates the relevance scores by applying machine learning techniques. For example, as described above with reference to FIG. 4, machine learning techniques may be used by the system to learn which types of objects or properties of objects are relevant to an observer. For example, certain environments may exhibit collision patterns and suffer from similar collision risks, e.g., similarly structured intersections or similarly located bus stops. In these cases the system may be trained to learn what types or properties of objects may be relevant to an observer.

The system selects a proper subset of the one or more objects based on the generated relevance scores (step 604). For example, the system may select a proper subset of the one or more objects that corresponds to the highest N scoring objects. As another example, the system may select a proper subset of the one or more objects that corresponds to a number of objects whose respective relevance scores are above a predetermined relevance score threshold. In some implementations, selecting a proper subset of the one or more objects may include filtering objects that have not moved more than a predetermined minimum amount over a period of time.

The system provides an indication of the objects in the subset for display on the display located between the observer and the barrier (step 606). In some implementations, the system selects a representation for a particular object, from among multiple different representations for the object, based on the relevance score for the particular detected object. For example, an object with a high relevance score may be represented using artificial colours, flashing lights or instructional signs. Example representations for occluded objects are illustrated above and below with reference to FIG. 1 and FIGS. 7A-7D.

FIGS. 7A-7D illustrate example displays 700a-700d showing different indications of occluded objects. For example, an intuitive occluded object indicator, e.g., the display described above with reference to FIGS. 1 and 2, can show the different indications of occluded objects. For clarity, the example displays 700a-700d represent indications of occluded objects at a fixed instance in time, as viewed by one observer. As described above with reference to FIG. 2, in some implementations, the example displays 700a-700d are dynamic displays and may provide multiple views of occluded objects to respective multiple observers.

Figure 7A:
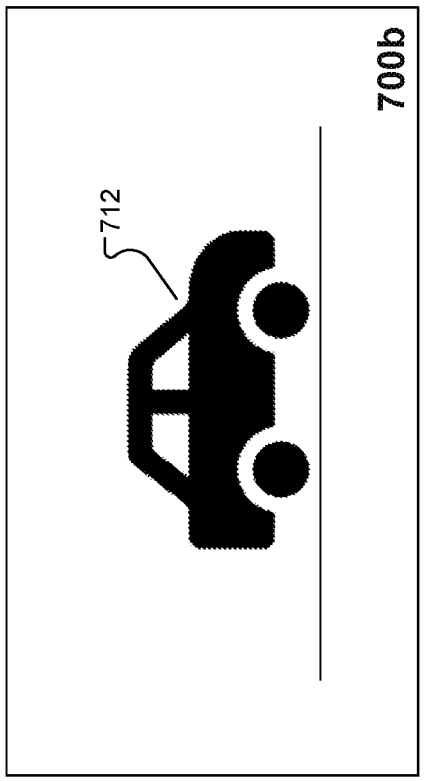
FIGS. 7A-7D illustrate example displays showing generated indications of occluded objects.

FIG. 7A illustrates an example display 700a showing an indication of an occluded person 702. For example, person 702 may be a pedestrian walking or jogging along a sidewalk and approaching an intersection, as described above with reference to FIG. 1. In this example the person 702 may be occluded from observers by a building or construction site located at the intersection. As another example the person 702 may be a child that has recently exited a school bus. In this example the child may be occluded from observers by the school bus.

The indication of the occluded person 702 shown by the display 700a may include a low resolution representation of the occluded person 702. In some implementations, a display may be configured to show a low resolution representation of an occluded object to save computational resources or due to economic considerations. For example, in cases where the display includes an array of light emitting diodes (LEDs) attached to a flexible surface, as described above with reference to FIG. 2, the resolution of the shown representation may depend on the number of LEDs used by the display to represent a single pixel. In some implementations, the resolution at which a display shows an indication of an occluded object depends on a resolution and dimensions of the display itself. For example, in cases where the display includes a projected indication of occluded objects, as described above with reference to FIG. 2, resolution of the shown representation may depend on the resolution of the projection and the dimensions of the projector screen.

The indication of the occluded person 702 shown by the display 700a is rendered dynamically such that at any point in time, occluded objects are represented in a manner that emulates a directionality and size at which the objects would appear to the observer if there were no occlusion—that is, the resolution at which indications are displayed does not affect the size and directionality at which indications are displayed.

Figure 7B:
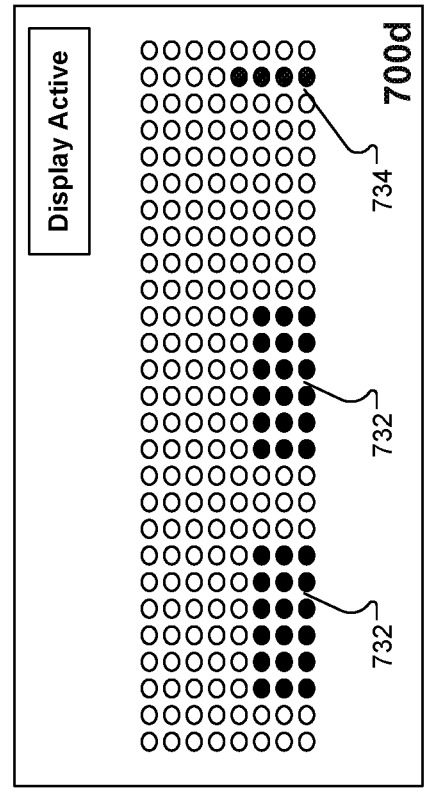

FIG. 7B illustrates an example display 700b showing an indication of an occluded automobile. For example, the automobile may be a vehicle that is travelling along a road and approaching an intersection, as described above with reference to FIG. 1. In this example the automobile may be occluded from observers by a building or construction site located at the intersection.

The indication of the occluded automobile shown by the display 700b includes an icon representation 712 of the occluded automobile. In some implementations, the display may be configured to show an icon representation or other enhanced representation to increase effectiveness of the display. For example, in some cases a brightly coloured icon representing an object may capture an observer's attention quicker than a realistic or true representation of the object. As another example, in some cases a brightly coloured icon representing an object may be more visible than a realistic or true representation of the object. For example, in cases where lighting is poor, e.g., due to weather conditions, a realistic representation or true representation may not be clearly visible. In addition, in cases where the display is active at night, a realistic representation or true representation may be visible but may lose important information that is beneficial to the observer. For example, at night a vehicle's headlights may be visible but the size of the vehicle may not be visible, or the directionality of the vehicle may be easily misinterpreted.

The icon 712 shown by the display 700b is rendered dynamically such that at any point in time, the icon emulates a directionality and size at which the corresponding occluded object would appear to the observer if there were no occlusion—that is, representing an occluded object using an icon or other enhanced imagery does not affect the size and directionality at which indications are displayed.

Figure 7C:
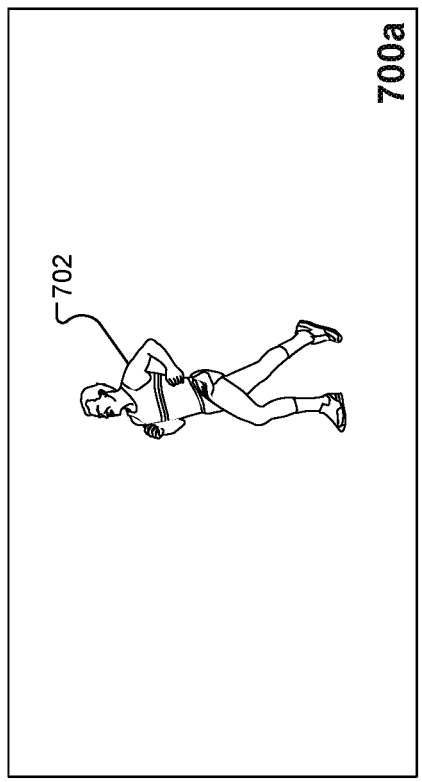

FIG. 7C illustrates an example display 700c showing an indication of an occluded vehicle or other road user. For example, the vehicle or road user may be travelling along a road and approaching an intersection where they have right of way. In this example the vehicle or other road user may be occluded from other vehicles approaching the intersection, e.g., by a building or construction site located at the intersection.

The indication of the occluded vehicle or road user shown by the display 700c includes a warning sign 722 of the occluded vehicle or road user. In some implementations, the display may be configured to show a warning sign to increase effectiveness of the display. For example, a warning sign may include instructions which, when followed by an observer, reduce the likelihood of a collision. As another example, a warning sign may be may be more visible than a realistic or true representation of the object, e.g., in cases where lighting is poor or at night as described above with reference to FIG. 7B. In some cases, the display may be configured to show a warning or other instructional sign using visual effects, e.g., flashing or zooming, to increase the effectiveness of the display. For example, In some implementations, a system that includes the display, e.g., system 200 described above with reference to FIG. 2, may be configured to dynamically monitor an area around the display and show warning signs in critical situations, e.g., in response to determining that an observer vehicle approaching an intersection has ignored previous indications that an occluded vehicle is also approaching the intersection, e.g., by monitoring the speed of the observer vehicle, the system may display a brightly coloured, flashing "give way" sign to emphasize the potential collision risk to the observer. In some cases, a warning sign may be imposed on an image of an occluded object. For example, in cases where an occluded object is a pedestrian approaching an intersection, the display may include a high-resolution image of the pedestrian with a "give way" icon imposed on the pedestrian—indicating to an observer that they must yield to the pedestrian at the intersection.

Figure 7D:
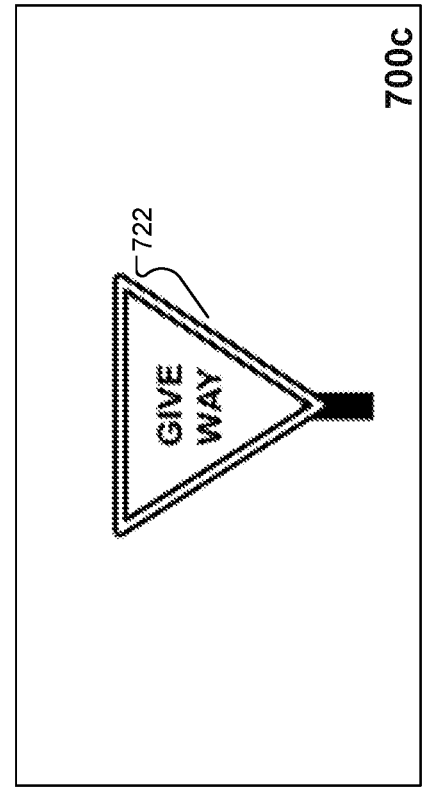

FIG. 7D illustrates an example display 700d showing an indication of occluded vehicles 732 and a pedestrian 734. For example, the vehicles 732 and pedestrian 734 may be travelling along a road and pavement and may be approaching an intersection. In this example the vehicles 732 and pedestrian 734 may be occluded from other vehicles approaching the intersection, e.g., by a building or construction site located at the intersection.

The indication of the occluded vehicles 732 and pedestrian 734 is shown by the display 700d using light strips. For example, as described above with reference to FIG. 3, in some implementations, a display may include one or more one-dimensional strings of lights. As shown in display 700d, the light strips may be used to represent different occluded objects in a manner than emulates the size and directionality of the objects as they would appear to an observer if there was no occlusion. For example, the pedestrian 734 is represented by illuminating a tall, thin array of lights, whereas the vehicles are represented by illuminating a larger, square array of lights. Although only one view of occluded objects is shown in FIG. 7D, the light strips may be used to display different views of occluded objects to different viewers, as described above with reference to FIG. 5, for example.

In some implementations, the light strips may be illuminated using different colours to increase effectiveness of the display. For example, fast moving objects that may represent a critical collision risk to an observer may be illuminated in red and/or using flashing lights. Slow moving objects that do not represent a critical collision risk to an observer may be illuminated in green. In some implementations, an object that does not represent a collision risk, e.g., a stationary object such as a parked car, may not be illuminated at all. In some examples the colour in which an object is represented may dynamically change, e.g., light strips representing a pedestrian who was initially walking at a slow pace but who starts running may change from green to red.

The display 700d further includes an example visual element 736. The example visual element 736 indicates whether the display is active or not. Providing an indication of whether the display is active or not may increase the effectiveness of the display. For example, in some cases a display may be inactive, e.g., when it is undergoing maintenance. In these cases an observer that regularly uses indications shown by the display may assume that there are no indications to show, which may increase the likelihood of a collision. By including a visual element that indicates when the display is active, or inactive, an observer may adjust their behavior accordingly, e.g., by reducing their speed as they approach an intersection, and avoid potential collisions.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A computer-implemented method comprising:
determining respective positions of multiple observers located in different vehicles, wherein the multiple observers have respective views of an area obstructed by a barrier;
selecting, for each of the multiple observers, a proper subset of multiple objects in the area, the proper subsets each respectively being selected based on (i) a speed and direction of movement of the observer to which the proper subset corresponds and (ii) speeds and directions of movement of the multiple objects in the area, the proper subsets each including a particular object of the multiple objects;
determining, for each of the multiple observers, a position of the particular object relative to the observer;
generating, for each of the multiple observers, an indication of the position of the particular object based at least in part on the determined position of the observer; and
concurrently displaying, on a display that is located outside the vehicles and that is located between the multiple observers and the barrier, the generated indications of the position of the particular object to the respective observers such that different indications of the position of the particular object are displayed to the respective observers based on the respective positions of the multiple observers and such that the display omits, for each of the multiple observers, indications of objects in the area that are not in the proper subset selected for the observer.

2. The method of claim 1, wherein concurrently displaying the generated indications of the position of the particular object comprises concurrently displaying, on a single display surface, different views of the particular object to each of the multiple observers based on the determined respective positions of the multiple observers.

3. The method of claim 2, wherein each different view of the particular object corresponds to a intersection of (i) a three-dimensional space between the respective observer's field of vision and the particular object, and (ii) the display.

4. The method of claim 2, wherein each different view of the particular object comprises a representation of the particular object that has a size and position in a respective observer's field of view that corresponds to a size and position that the particular object would have in the respective observer's field of view if the barrier were not present.

5. The method of claim 1, further comprising dynamically changing the indications of the position of the particular object as the positions of the multiple observers and the particular object change.

6. The method of claim 1, further comprising:
detecting a set of objects behind the barrier at multiple times; and
filtering, from the set of detected objects, objects that have not moved more than a predetermined minimum amount over a period of time.

7. The method of claim 1, further comprising:
generating, for each of the multiple objects, a relevance score indicative of a predicted relevance of the object to a particular observer whose view of the object is obstructed by the barrier; and
selecting, for the particular observer, a proper subset of the multiple objects based on the generated relevance scores.

8. The method of claim 7, comprising displaying, on the display and to the particular observer, an indication of each of the objects in the proper subset of the multiple objects that is selected for the particular observer, without displaying objects of the multiple objects that are not in the proper subset selected for the particular observer.

9. The method of claim 7, wherein generating the relevance scores comprises generating, for each object of the multiple objects, a relevance score based on one or more of (i) a size of the object, (ii) a shape of the object, (iii) movement of the object, (iv) a trajectory of the object, (v) proximity of the object to the barrier, (vi) an image recognition score for the object, (vii) a position of the particular observer, (viii) a trajectory of the particular observer, (ix) a measure of the particular observer's ability to brake or change trajectory, (x) historical data indicating objects in proximity to the barrier, (xi) historical data indicating similar types of barriers, or (xii) capabilities of the object.

10. The method of claim 7, further comprising, selecting a representation for a specific object of the multiple objects, from among multiple different representations for the specific object, based on the relevance score for the specific object.

11. The method of claim 1, further comprising augmenting, for at least one of the multiple observers, the generated indication of the position of the particular object based at least in part on the determined position of the observer with context or emphasis information.

12. The method of claim 1, wherein the display is stationary,
wherein at least a first observer of the multiple observers is in a moving vehicle such that the position of the moving vehicle changes relative to the display and the particular object, and
wherein the method comprises altering the indication of the position of the particular object displayed to the first observer to indicate the changing position of the moving vehicle relative to the particular object.

13. A system comprising:
one or more sensors; one or more computers; and
one or more storage devices storing instructions that are operable, when executed by the one or more computers, to cause the one or more computers to perform operations comprising:
determining respective positions of multiple observers located in different vehicles, wherein the multiple observers have respective views of an area obstructed by a barrier;
selecting, for each of the multiple observers, a proper subset of multiple objects in the area, the proper subsets each respectively being selected based on (i) a speed and direction of movement of the observer to which the proper subset corresponds and (ii) speeds and directions of movement of the multiple objects in the area, the proper subsets each including a particular object of the multiple objects;
determining, for each of the multiple observers, a position of the particular object relative to the observer;
generating, for each of the multiple observers, an indication of the position of the particular object based at least in part on the determined position of the observer; and
concurrently displaying, on a display that is located outside the vehicles and that is located between the multiple observers and the barrier, the generated indications of the position of the particular object to the respective observers such that different indications of the position of the particular object are displayed to the respective observers based on the respective positions of the multiple observers and such that the display omits, for each of the multiple observers, indications of objects in the area that are not in the proper subset selected for the observer.

14. The system of 13, wherein the one or more sensors comprise one or more video cameras, and the display comprises an array of multi-directional light-emitting elements that are each configured to selectively project light in different directions.

15. The system of claim 13, wherein the one or more computers and one or more storage devices are further configured to perform operations comprising:

concurrently displaying, on the display, different view of the particular object to each of the multiple observers based on the determined respective positions of the multiple observers.

16. The system of claim 13, wherein the operations comprise dynamically changing the indications of the position of the particular object as the positions of the multiple observers and the particular object change.

17. The system of claim 13, wherein the display is a first display, and wherein the first display is mounted at a first side of a building that is located at an intersection of a first road and a second road, the display facing toward and extending along the first road;

wherein the system comprises a second display mounted at a second side of the building, the second display facing toward and extending along the second road;

wherein the operations comprise:

selecting, for each of the multiple observers, one or more first objects from among a set of first candidate objects that approach the intersection along the second side of the building, the one or more first objects for each of the multiple observers being selected based on a speed and location of the observer and a speed and location for the respective first candidate objects;

displaying, to each of the multiple observers and on the first display, first indications of the one or more first objects selected for the observer;

selecting, for each of multiple second observers, one or more second objects from among a set of second candidate objects that approach the intersection along the first side of the building, the one or more second objects for each of the multiple second observers being selected based on a speed and location of the second observer and a speed and location for the respective second candidate objects; and displaying, to each of the multiple observers and on the second display, second indications of the one or more second objects selected for the second observer.

18. One or more non-transitory computer-readable media storing instructions that, when executed by one or more computers, cause the one or more computers to perform operations comprising:

determining respective positions of multiple observers located in different vehicles, wherein the multiple observers have respective views of an area obstructed by a barrier;

selecting, for each of the multiple observers, a proper subset of multiple objects in the area, the proper subsets each respectively being selected based on (i) a speed and direction of movement of the observer to which the proper subset corresponds and (ii) speeds and directions of movement of the multiple objects in the area, the proper subsets each including a particular object of the multiple objects;

determining, for each of the multiple observers, a position of the particular object relative to the observer;

generating, for each of the multiple observers, an indication of the position of the particular object based at least in part on the determined position of the observer; and concurrently displaying, on a display that is located outside the vehicles and that is located between the multiple observers and the barrier, the generated indications of the position of the particular object to the respective observers such that different indications of the position of the particular object are displayed to the respective observers based on the respective positions of the multiple observers and such that the display omits, for each of the multiple observers, indications of objects in the area that are not in the proper subset selected for the observer.

* * * * *